United States Patent
Obendiek

(10) Patent No.: US 6,722,723 B2
(45) Date of Patent: Apr. 20, 2004

(54) TOP FOR A CONVERTIBLE VEHICLE

(75) Inventor: Klaus Obendiek, Passau (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 0 days.

(21) Appl. No.: 10/247,168

(22) Filed: Sep. 19, 2002

(65) Prior Publication Data

US 2003/0052508 A1 Mar. 20, 2003

(30) Foreign Application Priority Data

Sep. 20, 2001 (DE) .......................... 101 46 267

(51) Int. Cl.⁷ .................................................. B60P 7/02
(52) U.S. Cl. .............. 296/107.08; 296/108; 296/107.09
(58) Field of Search .......................... 296/107.08, 136, 296/146.14, 102, 107.07, 107.09, 108, 107.17

(56) References Cited

U.S. PATENT DOCUMENTS

| | | | | |
|---|---|---|---|---|
| 1,748,736 A | * | 2/1930 | Selje ..................... | 296/107.08 |
| 2,046,574 A | * | 7/1936 | Olivier ................... | 296/107.08 |
| 2,747,928 A | * | 5/1956 | Olivier et al. .......... | 296/107.08 |
| 3,053,567 A | * | 9/1962 | Geiger .................. | 296/107.08 |
| 4,784,428 A | * | 11/1988 | Moy et al. ............. | 296/107.07 |
| 5,035,461 A | * | 7/1991 | Zweigart ............... | 296/107.08 |
| 5,067,768 A | * | 11/1991 | Fischbach ............. | 296/107.08 |
| 5,209,544 A | * | 5/1993 | Benedetto et al. ..... | 296/107.08 |
| 5,219,200 A | * | 6/1993 | Orth et al. ............. | 296/107.08 |
| 5,225,747 A | * | 7/1993 | Helms et al. .......... | 296/107.08 |
| 5,267,769 A | * | 12/1993 | Bonne et al. .......... | 296/107.08 |
| 5,295,722 A | * | 3/1994 | Bonne et al. .......... | 296/107.08 |
| 5,429,409 A | * | 7/1995 | Corder et al. ................ | 296/108 |
| 5,533,777 A | * | 7/1996 | Kleemann et al. ..... | 296/107.08 |
| 5,542,735 A | * | 8/1996 | Furst et al. ............. | 296/107.08 |
| 5,620,226 A | * | 4/1997 | Sautter, Jr. ............. | 296/107.08 |
| 5,743,587 A | * | 4/1998 | Alexander et al. .......... | 296/108 |
| 5,772,274 A | * | 6/1998 | Tokarz .................. | 296/107.09 |
| 5,785,375 A | * | 7/1998 | Alexander et al. .......... | 296/108 |
| 5,967,593 A | | 10/1999 | Schuler et al. .............. | 296/136 |
| 5,975,619 A | * | 11/1999 | Dettling et al. ........ | 296/107.08 |
| 6,010,178 A | * | 1/2000 | Hahn et al. ............ | 296/107.08 |
| 6,019,416 A | * | 2/2000 | Beierl ................... | 296/107.08 |
| 6,048,021 A | * | 4/2000 | Sautter, Jr. ............. | 296/107.08 |
| 6,102,771 A | * | 8/2000 | Poznick et al. ........ | 296/107.17 |
| 6,145,915 A | * | 11/2000 | Queveau et al. ....... | 296/107.08 |
| 6,199,936 B1 | * | 3/2001 | Mac Farland .......... | 296/107.08 |
| 6,227,604 B1 | * | 5/2001 | Grace .................... | 296/107.08 |
| 6,270,143 B1 | * | 8/2001 | Heselhaus et al. ..... | 296/107.07 |
| 6,283,532 B1 | * | 9/2001 | Neubrand .............. | 296/107.07 |
| 6,347,828 B1 | * | 2/2002 | Rapin et al. ........... | 296/107.17 |
| 6,422,636 B2 | * | 7/2002 | Mentink ................ | 296/107.09 |
| 6,425,621 B2 | * | 7/2002 | Miklosi et al. ........ | 296/107.08 |
| 6,454,343 B1 | * | 9/2002 | Wagner et al. ......... | 296/107.08 |
| 6,467,832 B2 | * | 10/2002 | Schutt et al. .......... | 296/107.08 |
| 6,508,502 B2 | * | 1/2003 | Willard ................. | 296/107.07 |
| 6,511,118 B2 | * | 1/2003 | Liedmeyer et al. .... | 296/107.08 |
| 6,520,561 B1 | * | 2/2003 | Miklosi et al. ........ | 296/107.08 |
| 2002/0003355 A1 | * | 1/2002 | Mac Farland .......... | 296/107.08 |

FOREIGN PATENT DOCUMENTS

| | | |
|---|---|---|
| DE | 19637005 | 12/1997 |
| DE | 10039682 | 3/2002 |

* cited by examiner

*Primary Examiner*—Kiran Patel
(74) *Attorney, Agent, or Firm*—Davidson, Davidson & Kappel, LLC

(57) ABSTRACT

A top mechanism for a convertible vehicle includes a rear region of the convertible vehicle arranged behind a passenger compartment and is configured to receive a top, in an opened state of the top. The top mechanism also includes a rear element at least partially covering the rear region in a closed state of the top. The top mechanism also includes a covering element, and at least one rear roof part. The covering element, in a first position associated with a closed state of the top, is adjacent at one end to a boundary of the passenger compartment and is adjacent at the other end to the rear roof part. The covering element is movable to a second position for providing a movement space for the top, and is moveable to a third position associated with an opened state of the top, in which the covering element is adjacent at one end to the boundary of the passenger compartment and is adjacent at the other end to the rear element.

14 Claims, 16 Drawing Sheets

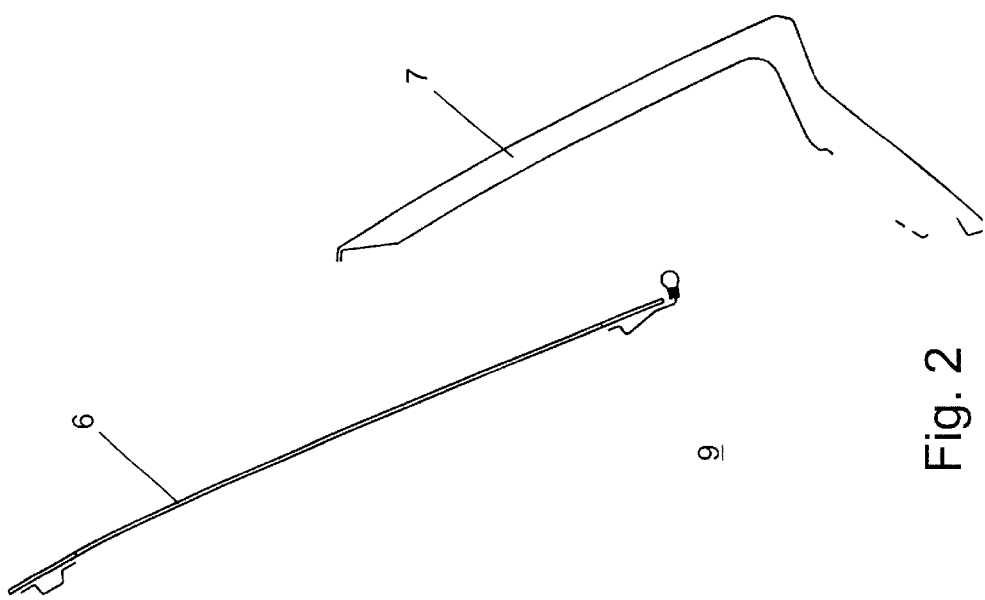
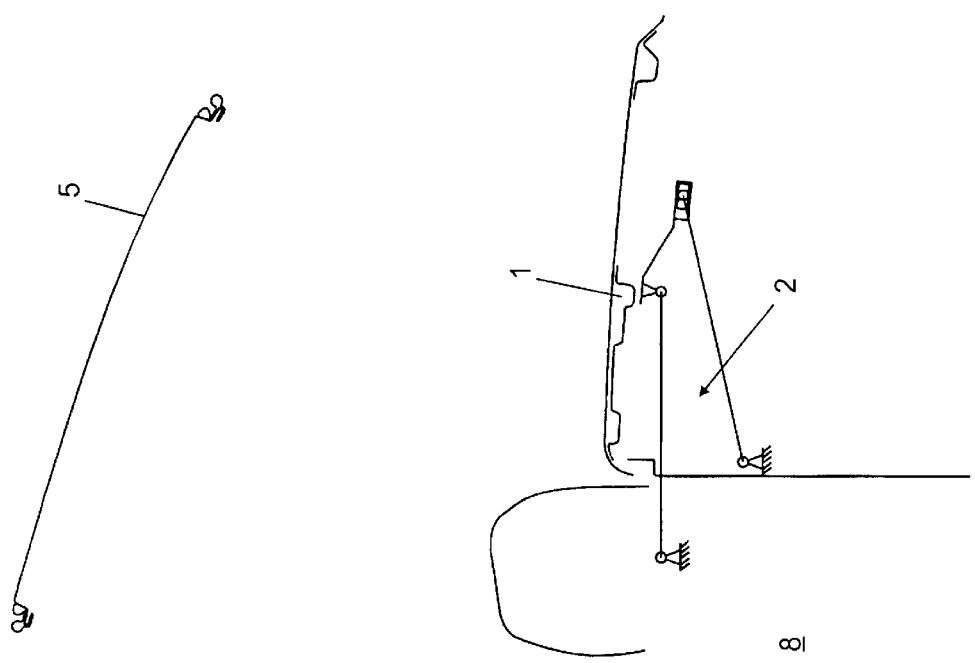
Fig. 2

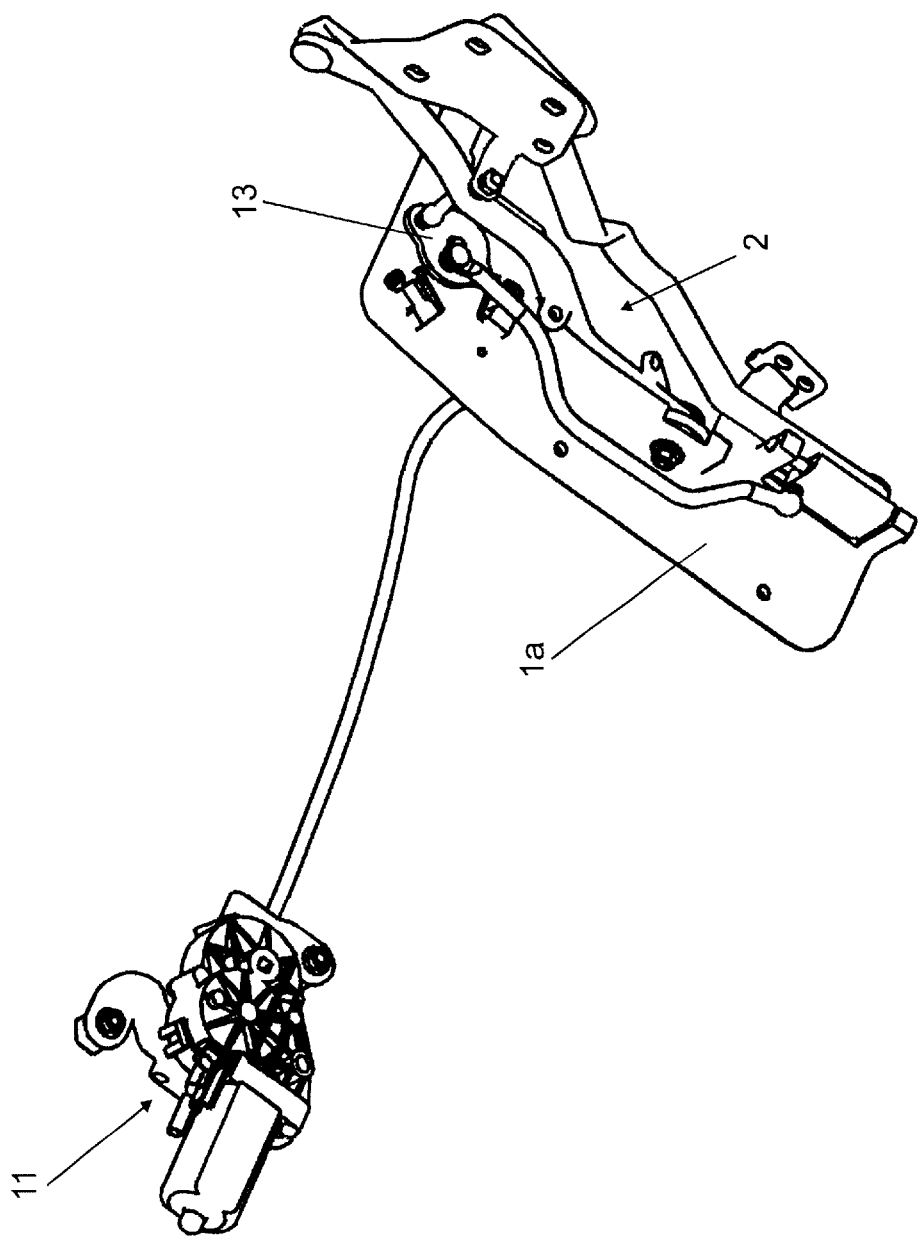

TOP FOR A CONVERTIBLE VEHICLE

Priority to German Patent Application No. 101 46267.0-21, filed Sep. 20, 2001 and hereby incorporated by reference herein, is claimed.

BACKGROUND INFORMATION

The present invention relates to a top for a convertible vehicle, including a rear region of the convertible vehicle arranged behind a passenger compartment and intended for receiving a deposited top, in an opened state of the top.

In the construction of modern convertible vehicles, it is of increasing importance to provide the tops with the option of an automatic opening and closing process. One concern in an opening and closing process of this type involves the processes in the rear region of a convertible vehicle, in which, firstly, care has to be taken to ensure that, during an opening process, the top has sufficient space to pass through on its way into a storage position in the rear region of the vehicle, and, secondly, parts of the opened top can no longer be seen and the rear region is completely closed again.

DE 196 37 005 C1 describes a covering element which, in a closed state of the top, is positioned in the manner of a conventional rear shelf below a rear window, can be pivoted open during a top-opening movement and, in a closed state of the top, can be arranged in a position essentially displaced in the rear direction with respect to the position of the rear shelf. In the case of such a displacement of the rear shelf in the rear direction, said shelf serving to bridge the opening, caused by the absence of the rear roof part, in the rear region of the vehicle, the inevitable result is that a new opening arises between the front edge of the rear shelf and a rear boundary of the passenger compartment, said opening corresponding in its width to the displacement of the rear shelf. In general, further flap-like elements therefore have to be provided on the rear shelf, which elements can be pivoted open or shut after displacement of the rear shelf, in order to bridge all of the openings. The device described in DE 196 37 005 C1 is only shown in part, but from details of the drawings, for example, the shaping of the fitting part 12 in FIG. 3, it can be seen that a further, pivotable flap element adjoining the front of the rear shelf 7 is provided, in order, at least in an opened state of the top, to close all of the openings. This results in a complicated mechanism and in additional conspicuous gaps, which can be seen from the outside.

DE 100 39 682 A1 describes a retractable top for a convertible vehicle in which a rear shelf is moveably connected to a rear element of the vehicle, wherein the rear shelf can be deposited below the rear element and the rear element can be swung open in order to release a space for retraction and storage of roof parts of the top. In the open state of the top, the rear element and the rear shelf are arranged in the same position as in the closed state of the top. A problem with gaps remaining due to a retraction of a rear roof part does not arise here as the rear roof part is simply placed upon the rear shelf in the closed state of the top.

U.S. Pat. No. 6,145,915 describes a retractable top in which a rear shelf is moveably connected to a rear element of the vehicle, wherein the rear shelf can be deposited below the rear element and the rear element can be swung open in order to release a space for retraction and storage of roof parts of the top. In the open state of the top, the rear element and the rear shelf are arranged in the same position as in the closed state of the top. Although a rear roof part is arranged between the rear element and the rear shelf in the closed position of the top and therefore leaving a gap when the rear roof part has been retracted, no measures in order to overcome the resulting gap are disclosed.

SUMMARY OF THE INVENTION

An object of the present invention is to provide a top for a convertible vehicle, in which a covering of the rear region of the convertible vehicle, which covering has as few gaps as possible, is made possible by simple means.

It is a further object of the present invention to provide a method for opening a top of a convertible vehicle, in which a simple covering of the rear region of the convertible vehicle is made possible.

The present invention provides a top for a convertible vehicle. The top includes a rear region of the convertible vehicle, which region is arranged behind a passenger compartment and is intended for receiving a deposited top, in an opened state of the top. The top also includes a rear element at least partially covering said rear region, at least in a closed state of the top. The top also includes a covering element, and at least one rear roof part. The covering element, in a first position assigned to a closed state of the top, is adjacent at one end to a boundary of said passenger compartment and is adjacent at the other end to said rear roof part. The covering element is movable into a second position releasing a movement space for the top, and the covering element, in a third position assigned to said opened state of the top, is adjacent at one end to said boundary of said passenger compartment and is adjacent at the other end to said rear element.

In this case, a covering element, which, in a first position is assigned to a closed state of the top, is adjacent at one end to a boundary of the passenger compartment and is adjacent at the other end to the rear roof part, and which can be moved into a second position releasing a movement space for the top, is advantageously designed in such a manner that it can be moved into a third position assigned to the opened state of the top, with the result that it is adjacent at one end to the boundary of the passenger compartment and at the other end to the rear element. In this manner, further movable parts of a covering element, in particular, parts which can be pivoted about the transverse axis of the vehicle, can advantageously also be omitted.

In a preferred embodiment of a top according to the present invention, the covering element has a linkage mechanism comprising a four-bar linkage, the covering element being connected movably to the convertible vehicle by means of the linkage mechanism. In particular, one joint of the linkage mechanism is designed in such a manner that the distance of the axis of rotation of the joint to an axis of rotation of an adjacent joint in the linkage mechanism can be changed, as a result of which the three positions of the covering element can be taken up in a particularly simple manner.

It is advantageous here for a first force introducing unit to be provided on the covering element, most of the movement of the covering element relative to the convertible vehicle being brought about by said force introducing unit, it being possible to change the distance of the axis of rotation of the joint by means of a second force introducing unit provided on the covering element. In particular, the second force introducing unit can advantageously be used at the same time to move flap elements, which are held movably on the covering element. These flap elements are generally folded into a plane together with the covering element if the top is in an opened state, and are folded downward in order to release a space for the C-pillars of the top in the closed state of the top.

The provision of the force introducing units on the covering element provides, in particular, the option of a modular construction of a covering element for a top according to the present invention, with the result that a covering element of this type can be adapted in its shaping to different types of vehicle with little effort.

In a particularly advantageous design of a top according to the present invention, the top is designed as a multi-part, in particular three-part hard-shell collapsible top. However, the top may also be a conventional folding top, in case there is a likewise problem of an opening remaining when the top is retracted into a rear region of the convertible vehicle.

The present invention also provides a method for opening a top of a convertible vehicle. The method includes opening a rear element of the vehicle in order to release a substantial part of a movement space of the top, and pivoting a covering element open, starting from a first position in which said covering element is adjacent to a rear boundary of a passenger compartment and is also adjacent to a rear roof part of the top, into a second position of the covering element in which the covering element releases additional space for the opening of the top. The method also includes retracting roof parts of the top into a rear region of the convertible vehicle, and closing the rear element again and moving the covering element into a third position in which the cover element is adjacent to the rear boundary of the passenger compartment and is also adjacent to the rear element.

Further features and advantages of a top according to the present invention emerge from the exemplary embodiment described below and from the claims.

BRIEF DESCRIPTION OF THE DRAWINGS

A preferred exemplary embodiment of a top according to the present invention will be described below and explained in greater detail with reference to the attached drawings, in which:

FIG. 2 shows a top according to claim 1 in a first step of an opening movement;

FIG. 16 shows a three-dimensional view of the driving mechanism according to FIG. 13 from a fourth viewing angle.

DETAILED DESCRIPTION OF A PREFERRED EMBODIMENT

Figure 3:
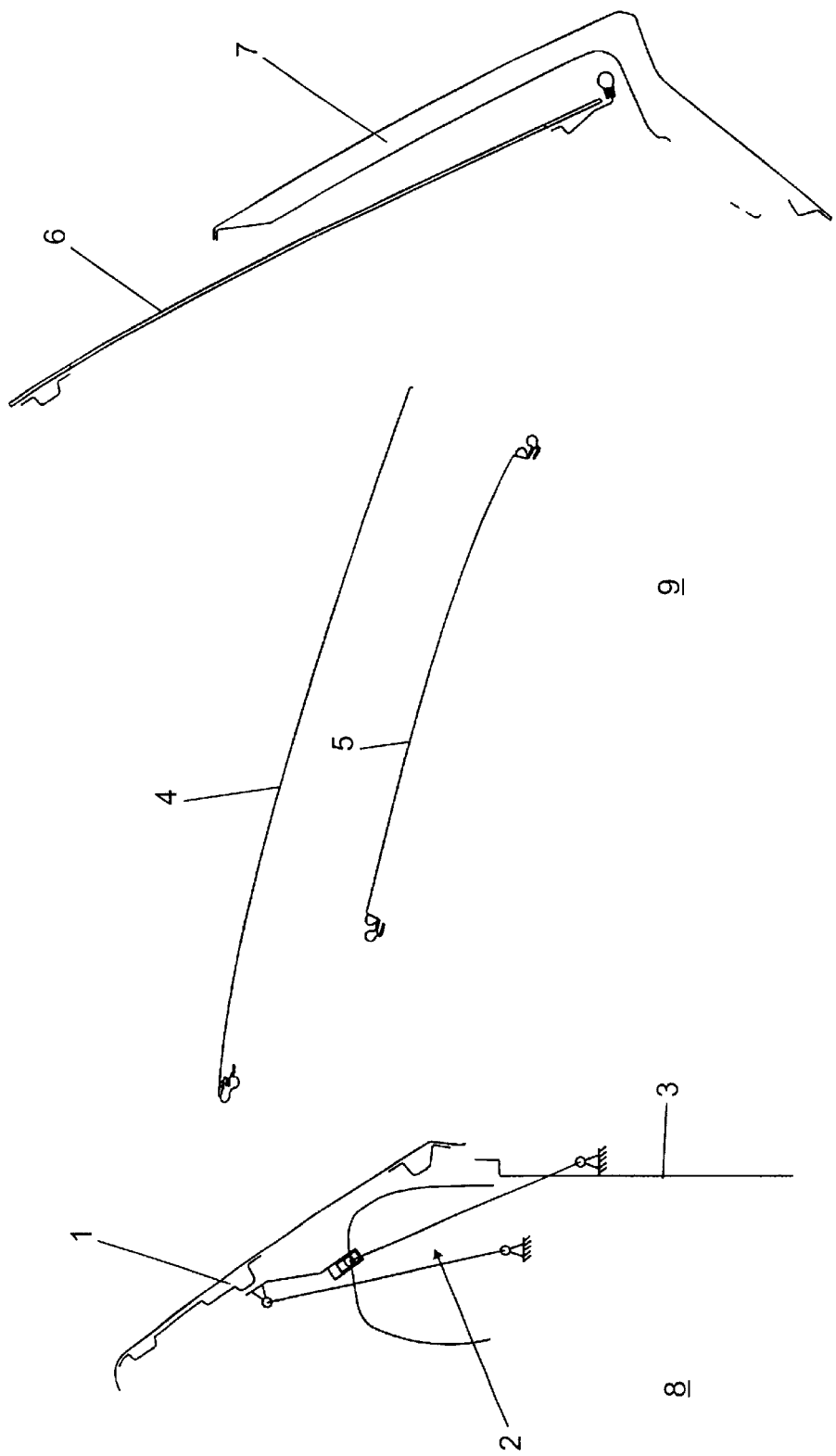
FIG. 3 shows a top according to claim 1 in a second step of an opening movement.
Figure 4:
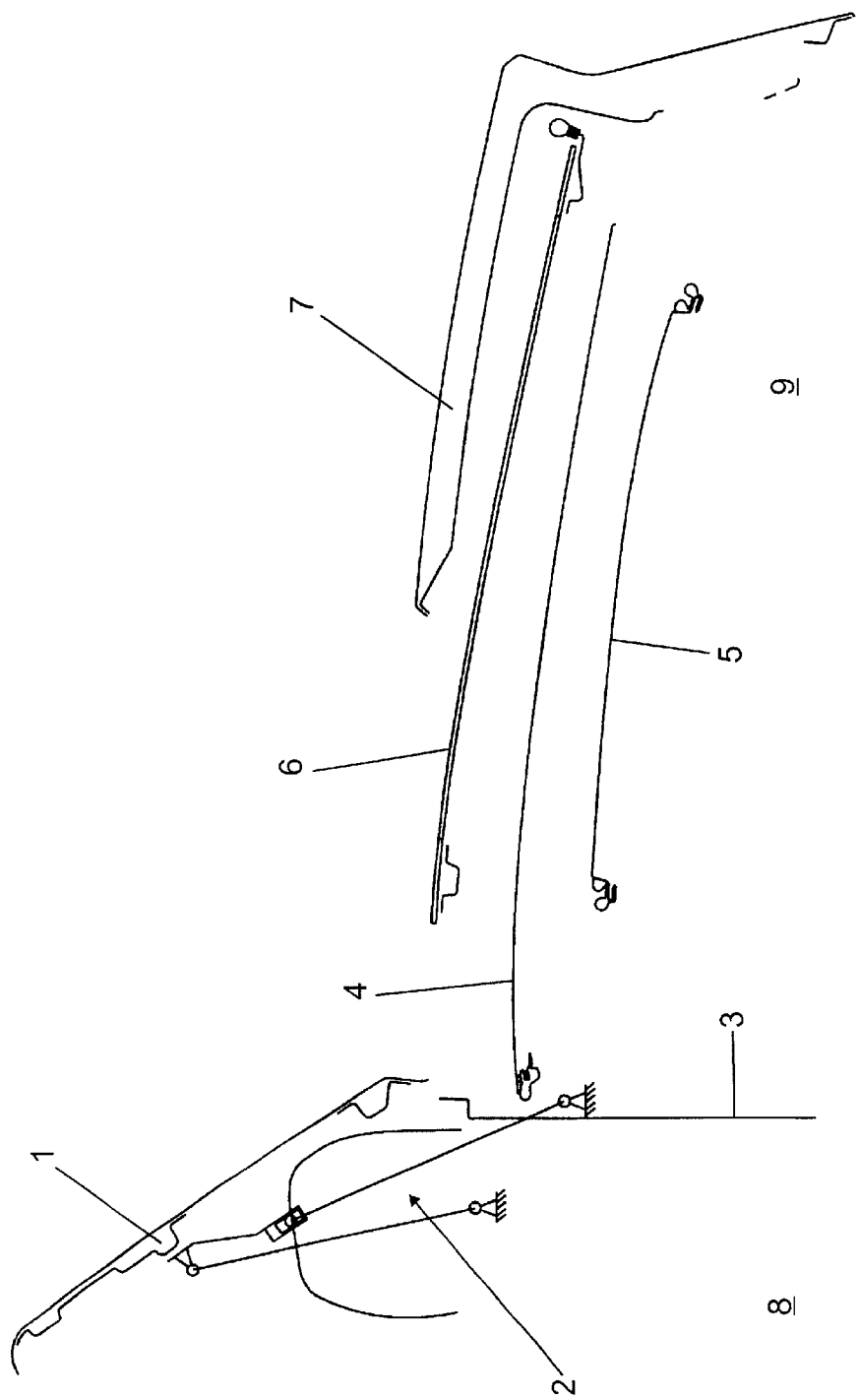
FIG. 4 shows a top according to FIG. 1 in a third step of an opening movement.
Figure 5:
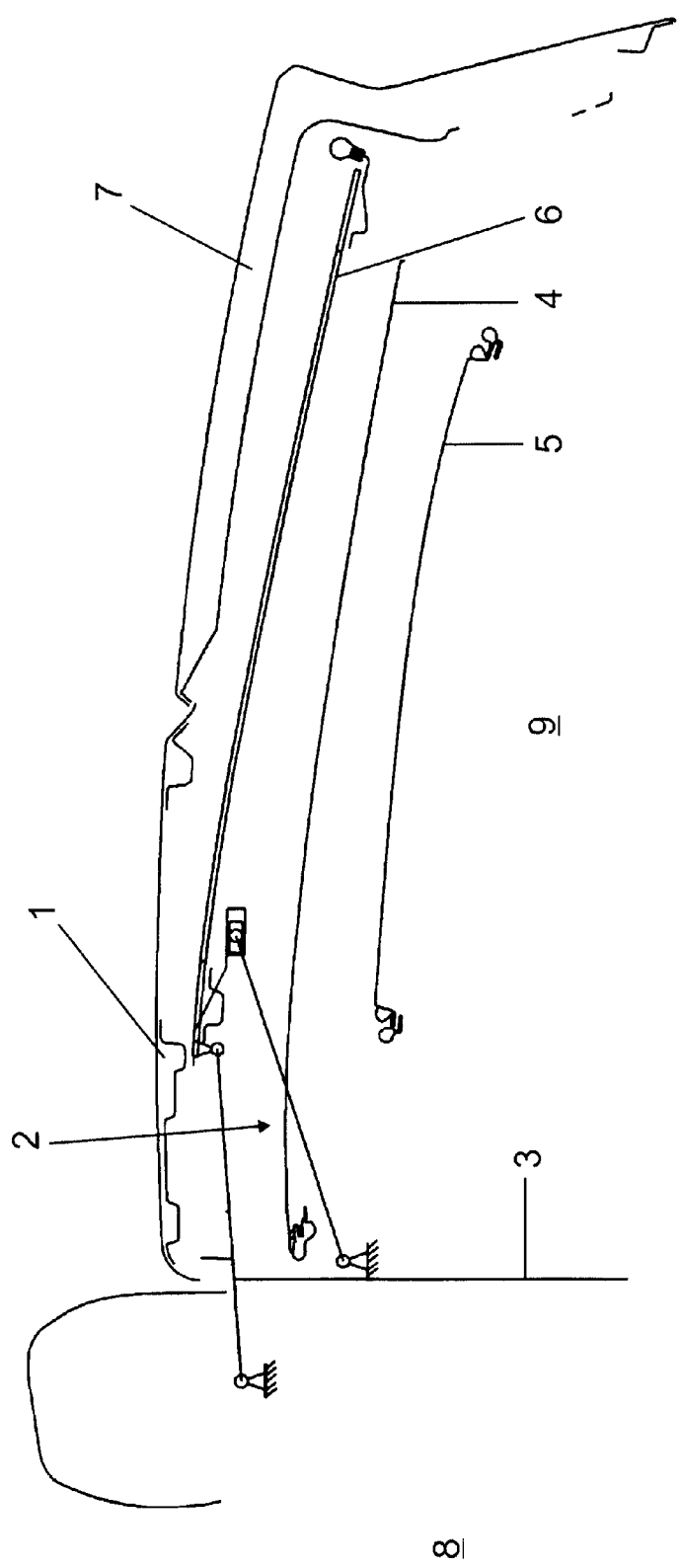
FIG. 5 shows a top according to FIG. 1 in an opened state of the top.

As FIGS. 1–5 show, a top according to the present invention for a convertible vehicle comprises a front roof part 4, a central roof part 5 and a rear roof part 6. The rear roof part 6 comprises a rigid rear window. In a closed state of the top according to FIG. 1, the roof parts 4, 5, 6 cover a passenger compartment 8 of the convertible vehicle. A rear region 9 of the convertible vehicle is partially covered by a pivotable rear element 7. Between the passenger compartment 8 and the rear region 9 is a boundary 3 which can be regarded as a rear boundary of the passenger compartment 8. In the present exemplary embodiment, the boundary 3 is illustrated schematically as a partition, arranged essentially vertically, between the passenger compartment 8 and rear region 9 of the vehicle (see FIG. 1–FIG. 5). However, the boundary may also be formed directly by the rear seats of the vehicle. In particular, the boundary 3 may also be designed in a manner such that it can move, for example in the form of seats which can be folded over. A covering element 1 is arranged movably in the region between the boundary 3 and the rear element 7 and is connected to the convertible vehicle by means of a linkage mechanism 2, which is essentially designed as a four-bar linkage. In this arrangement, a first rotational joint 2a and a second rotational joint 2b of the linkage mechanism are in each case connected in a positionally fixed manner to the convertible vehicle. The second rotational joint 2b is connected to a third joint 2c by means of a first link 2e, and the first joint 2a is connected to a fourth joint 2d in the linkage mechanism 2 by means of a second link 2f. The third joint 2c and the fourth joint 2d are arranged on the covering element 1, the third joint 2c having the special feature of being held displaceably in a guide 2g, the guide 2g being formed in a positionally fixed manner on the covering element 1. The link mechanism 2 can thus be referred to as a four-bar linkage having a variable axis of rotation. In particular, in a closed state of the top according to FIG. 1, the third joint 2c in the guide 2g is in a first end position, and, in an opened state of the top according to FIG. 5, is in a second end position. The effect thereby achieved in a simple manner is that the position of the covering element 1 starting from a first position assigned to the closed state of the top, according to FIG. 1, to a third position corresponding to the opened state of the top, according to FIG. 5, undergoes essentially a pivoting about an imaginary axis of rotation which is arranged in a region A in which, according to FIG. 1 to FIG. 5, a front end of the covering element 1 and an upper end of the boundary 3 are adjacent to each other.

Figure 6:
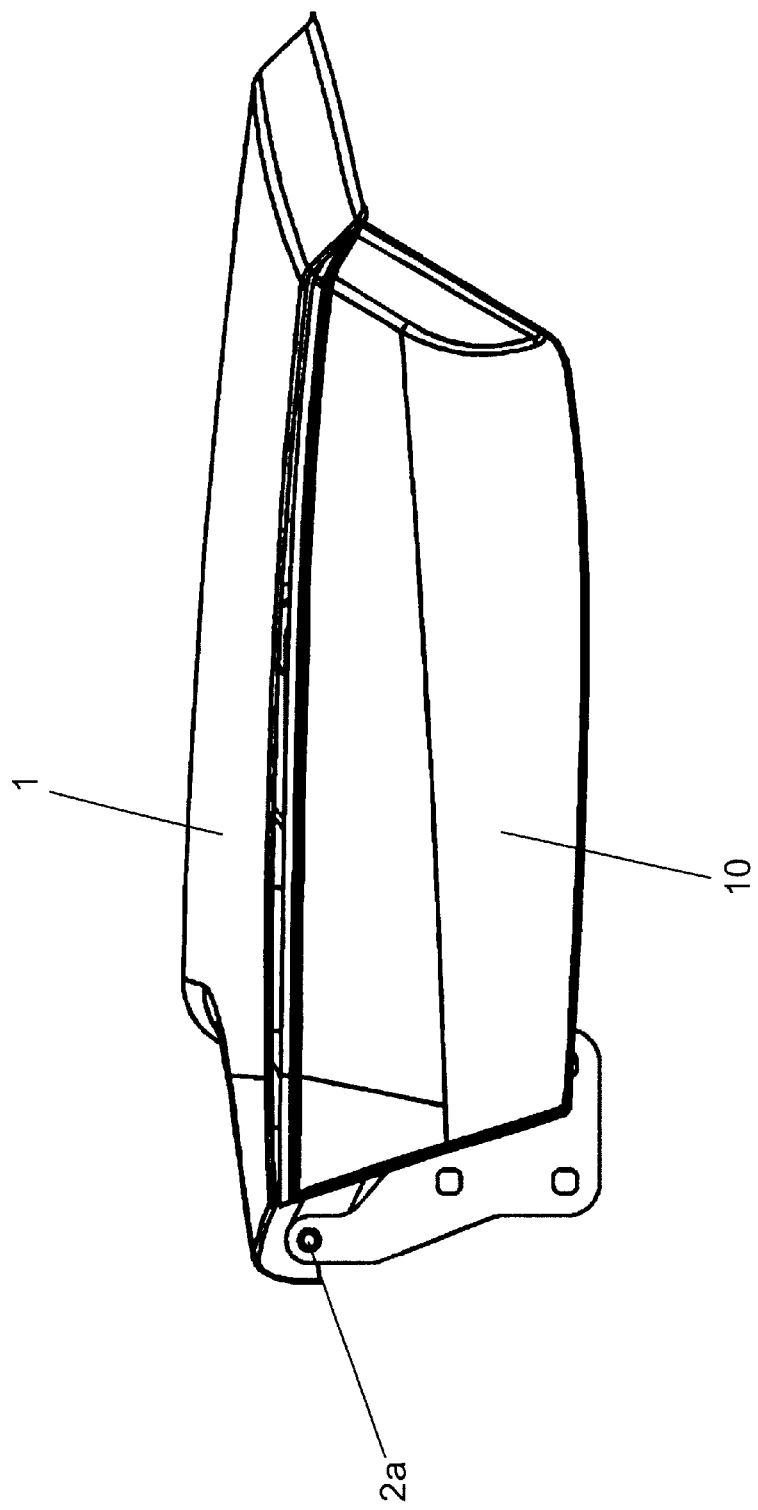
FIG. 6 shows a side view of a covering element of a top according to the present invention in a first position assigned to the closed state of the top.
Figure 7:
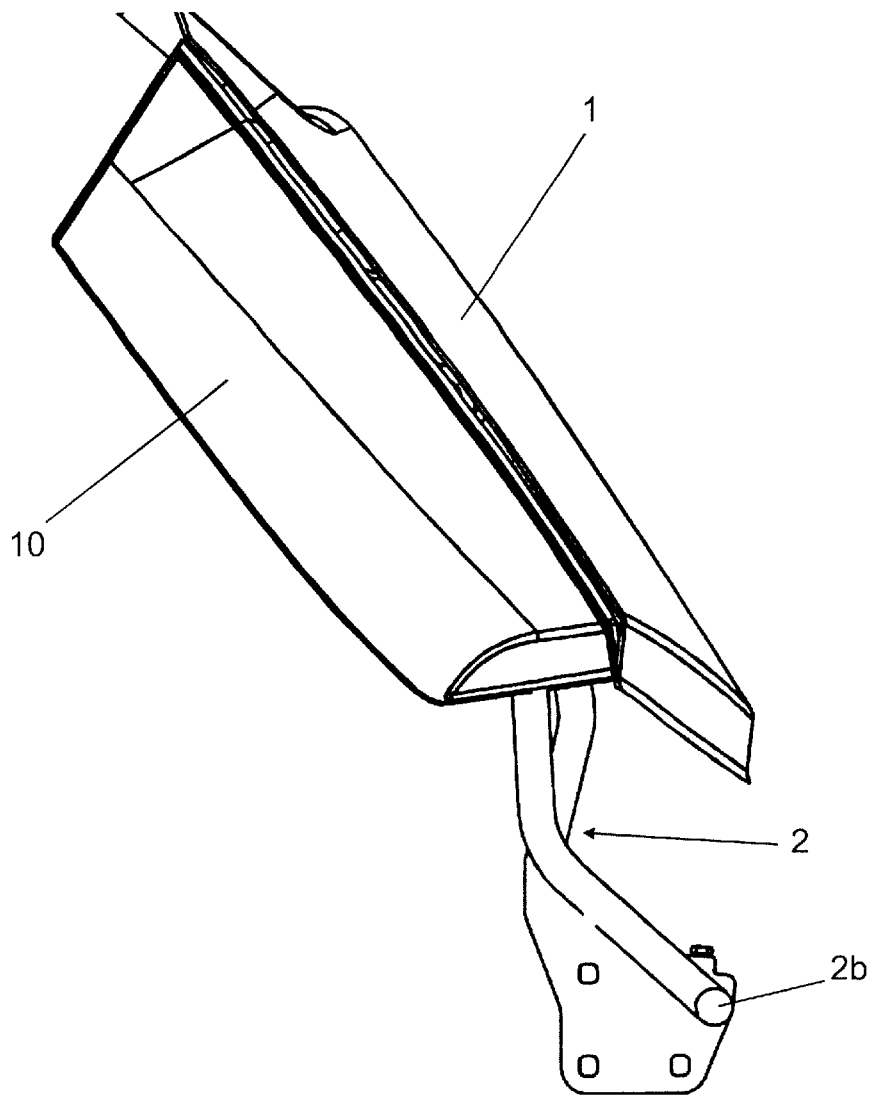
FIG. 7 shows the covering element according to FIG. 6 in a second position releasing a movement space for the top.
Figure 8:
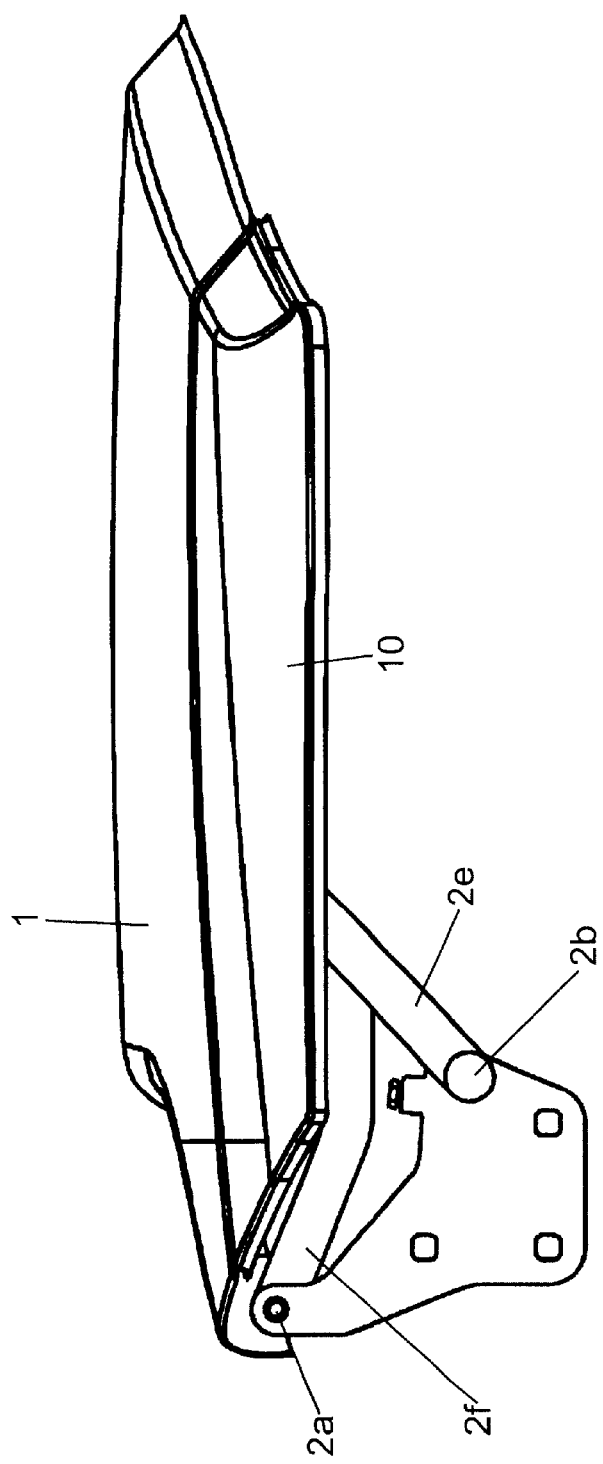
FIG. 8 shows the covering element according to FIG. 6 in a third position assigned to the opened state of the top.

From the illustrations of the covering element 1 according to FIG. 6, FIG. 7 and FIG. 8 it can be seen that the covering element 1 has a flap part 10, which is formed on the covering element 1 in a manner such that it can pivot laterally. A respective flap part 10 is provided on each side of the covering element 1, the arrangement of the two flap parts being of symmetrical design, with the result that an illustration of the second flap part in each case is omitted. In a closed state of the top, the flap part 10 is in a folded down state, so that the opening which results provides space for C-pillars of the top, which pillars are formed on the rear roof part 6. In this closed state of the top (see FIG. 1), only the covering element 1 can be seen from the outside while the folded down flap parts 10 cannot be seen. In this state, the flap part 1 therefore has essentially the position and the appearance of a conventional rear shelf.

FIG. 7 shows the covering element 1 in a second position in which it is raised and releases the movement space for the top, as also shown schematically for the covering element 1 in FIG. 3 and FIG. 4.

FIG. 8 shows the covering element 1 in the third position assigned to the opened state of the top, in which it can be seen that the flap parts 10 are folded upward in order to cover the openings which have been released by the C-pillars of the top which has been retracted into the rear region 9 of the convertible vehicle. The covering element 1 and the flap parts 10 are preferably designed in their surface and color in such a manner that, in the opened state of the top, they fit as uniformly as possible into the bodywork of the convertible vehicle.

Figure 9:
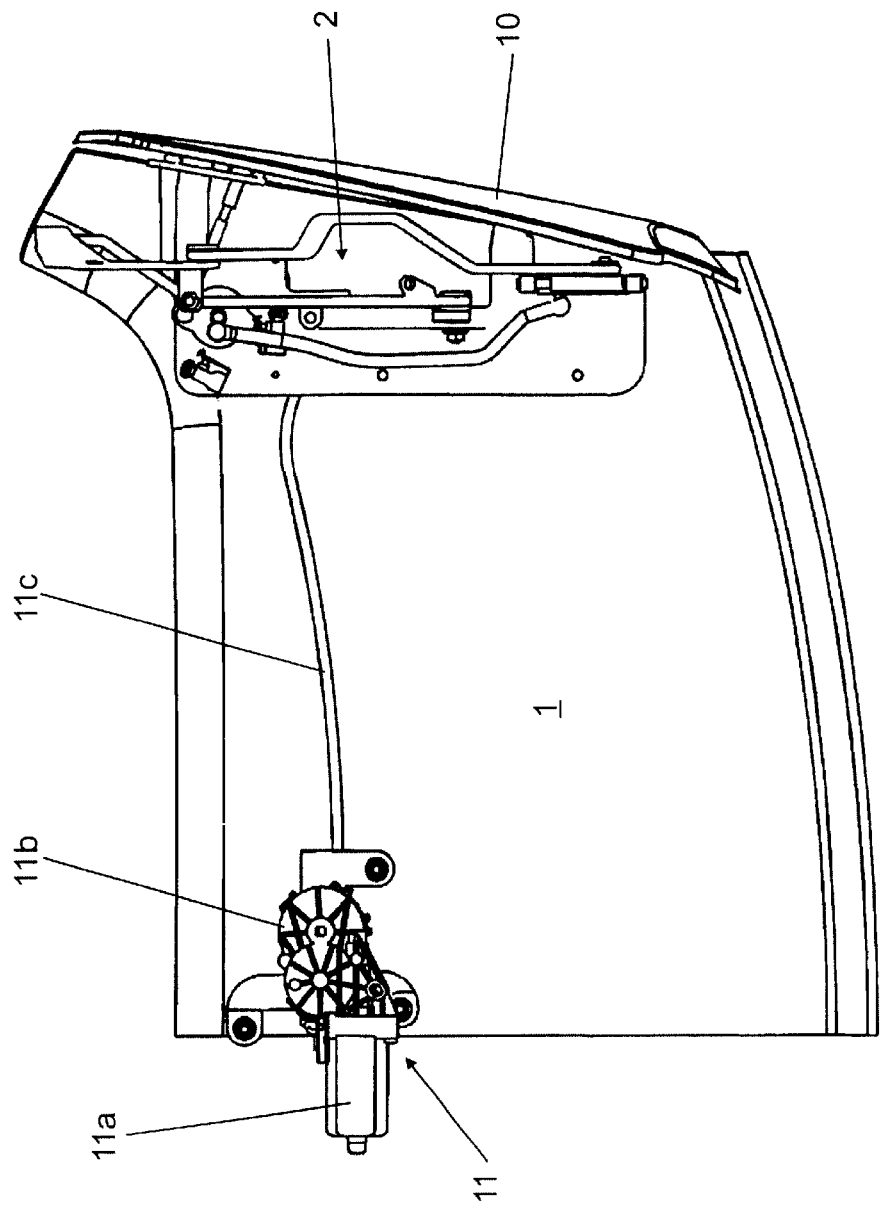
FIG. 9 shows a plan view from below of the covering element of a top according to the present invention in a position assigned to the closed state of the top.
Figure 10:
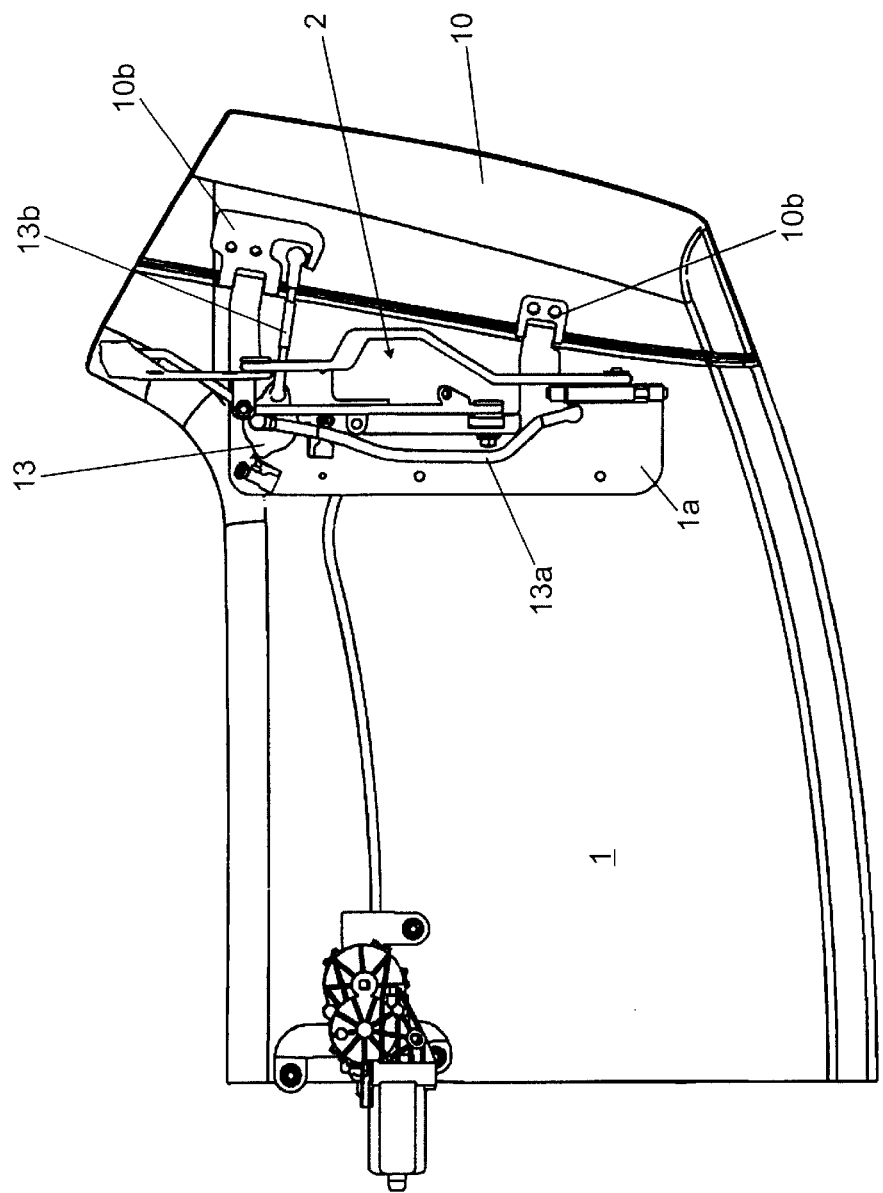
FIG. 10 shows a plan view from below of the covering element according to FIG. 9 in a position assigned to the opened state of the top.
Figure 11:
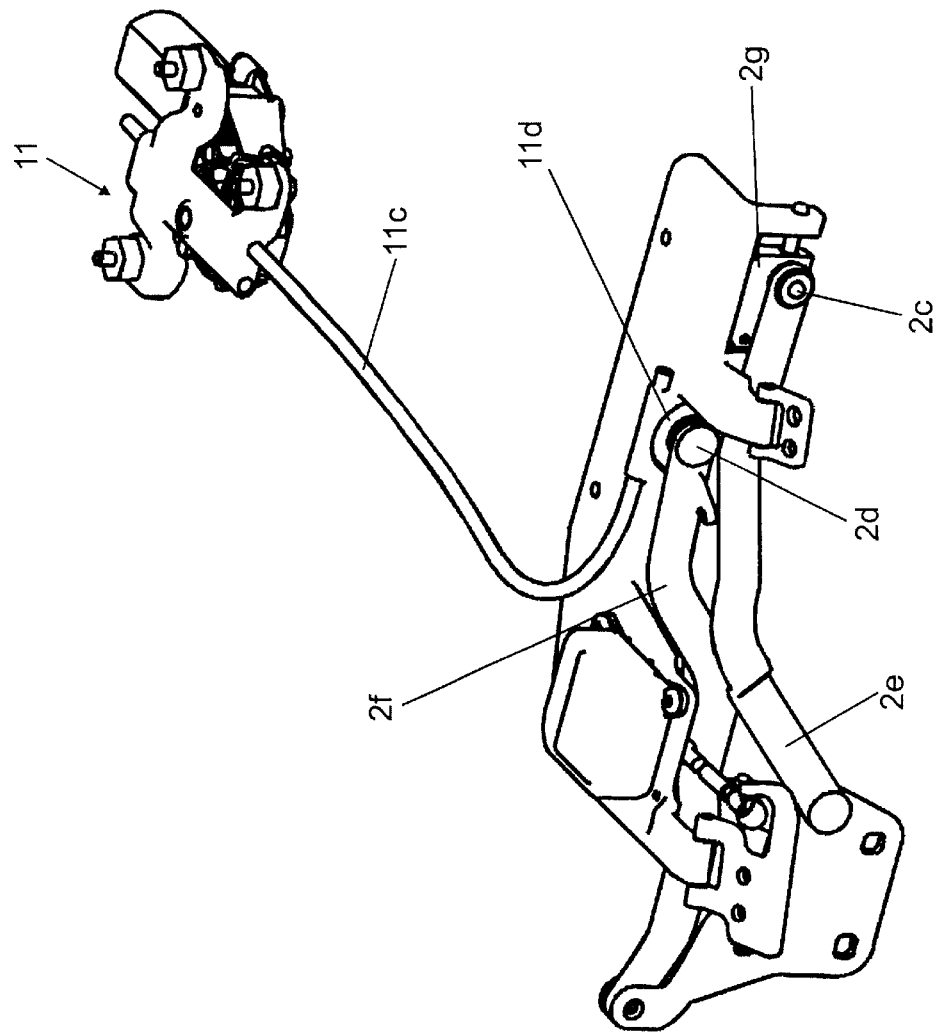
FIG. 11 shows a three-dimensional view of a driving mechanism of the covering element according to FIG. 9 in a position assigned to the closed state of the top.

FIG. 9 and FIG. 10 show, in particular, the manner in which the mechanism necessary for securing and moving the covering element 1 is arranged and designed. In this case, a first force introducing unit 11, which comprises an electric motor 11a, a gear mechanism 11b and a driven transmission cable 11c, which is guided in a guide tube, is fixed on the lower side of the covering element 1. The transmission cable 11c leads to the linkage mechanism 2. By means of the transmission cable 11c and a gear mechanism 11d, the driving force for the linkage mechanism 2 is acted upon the linkage mechanism 2, in the region of the fourth rotational joint 2d (see FIG. 11). In this arrangement, the second link 2f is driven via the fourth rotational joint 2d.

Figure 12:
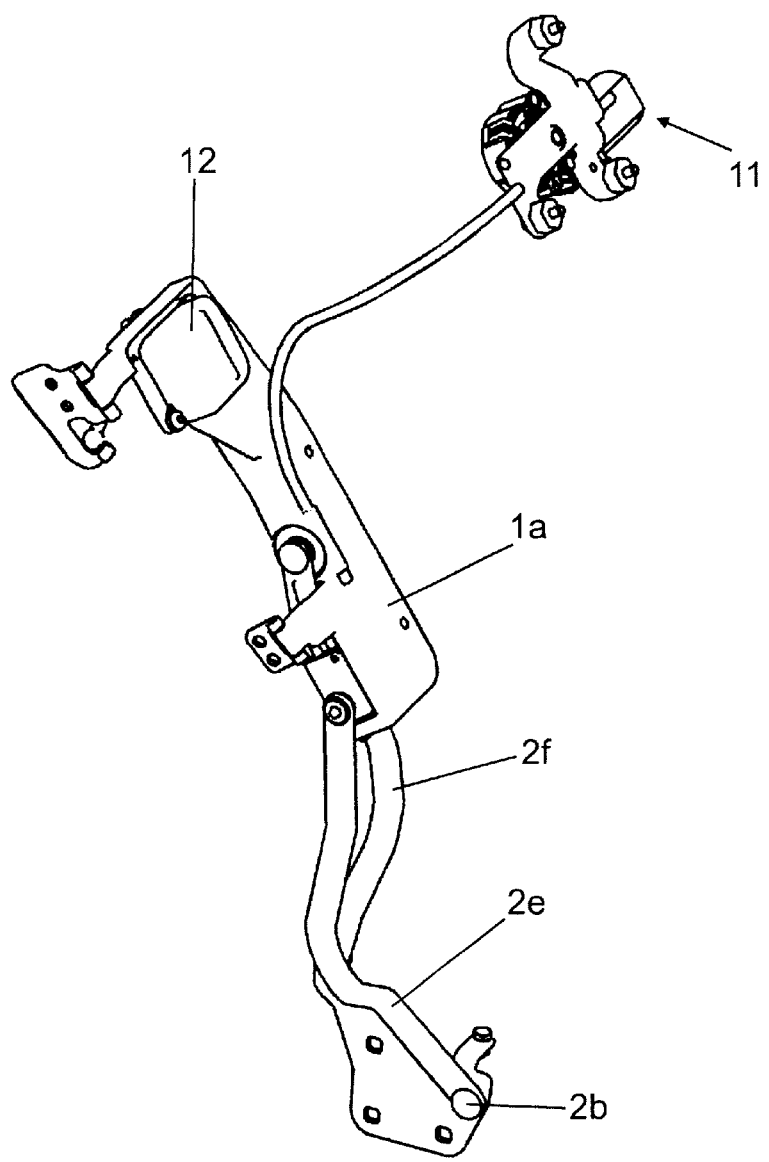
FIG. 12 shows the driving mechanism according to FIG. 11 in a second position releasing a movement space for the top.
Figure 13:
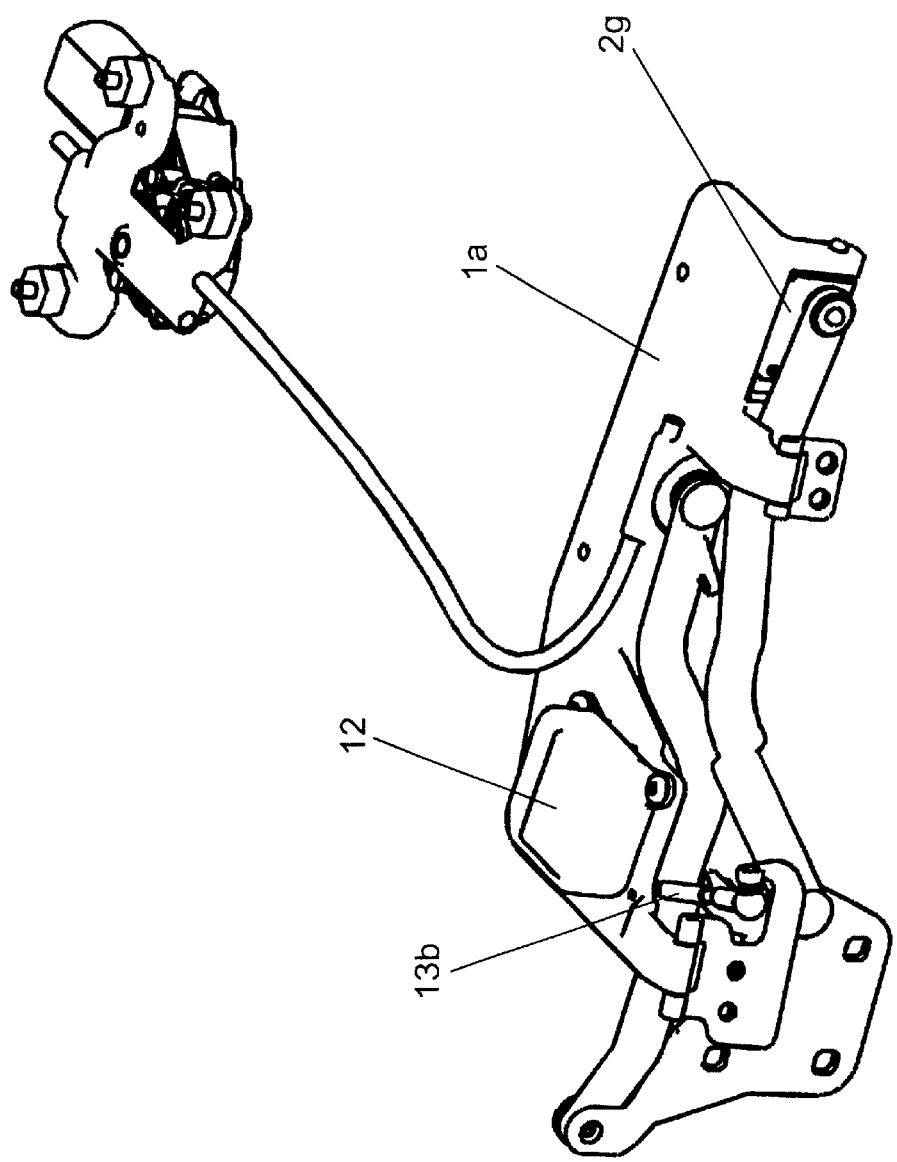
FIG. 13 shows the driving mechanism according to FIG. 11 in a third position assigned to the opened state of the top.
Figure 14:
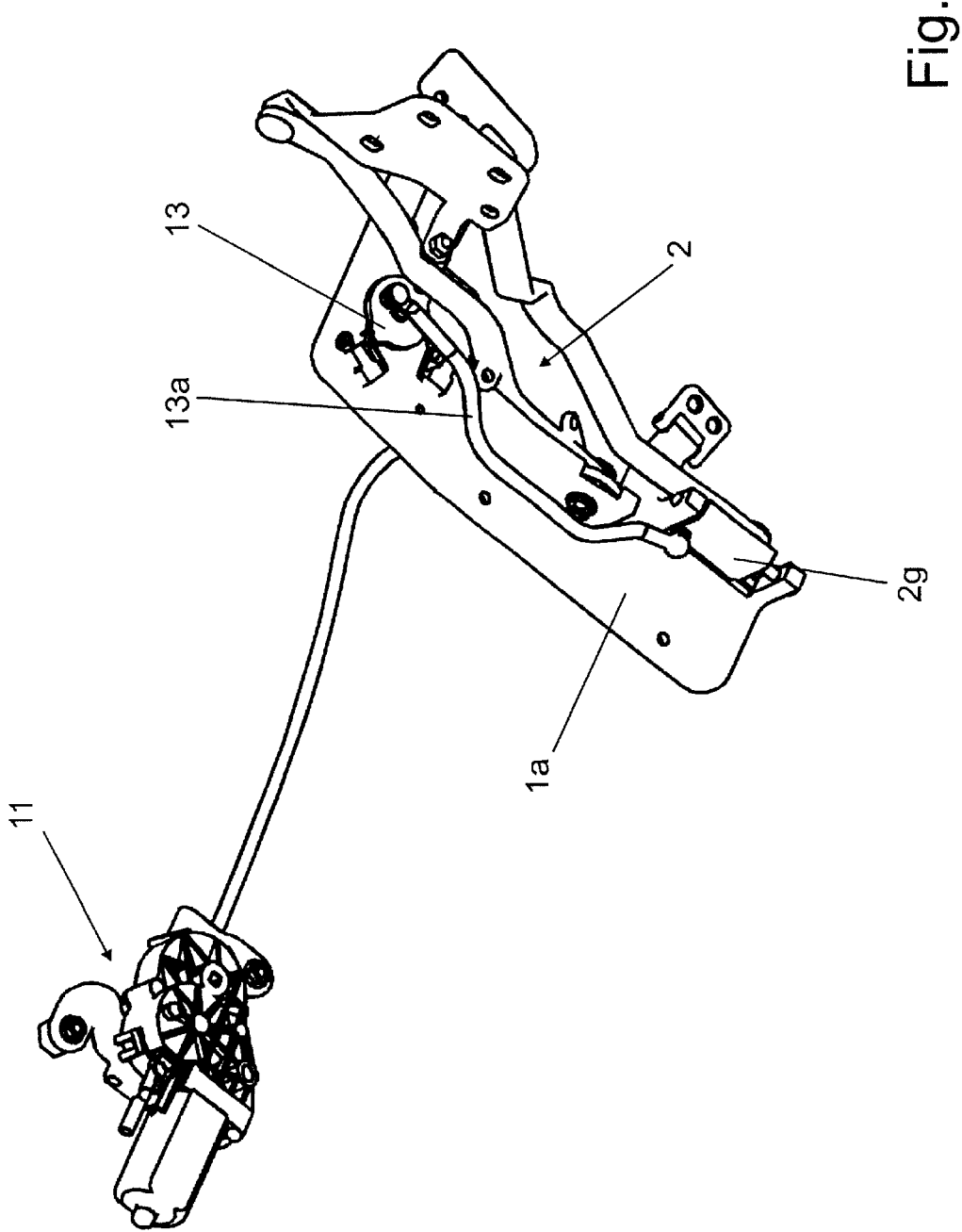
FIG. 14 shows a three-dimensional view of the driving mechanism according to FIG. 11 from a second viewing angle.

A support element 1a is fixed on the covering element 1. The support element 1a forms a coupler of the linkage mechanism 2, which is essentially designed as a four-bar linkage. At the same time, a second force introducing unit 12 (see FIG. 12) which drives a rotational disc 13 is provided on the support element 1a. The second force introducing unit 12 comprises an electric motor which is configured to be significantly smaller than the electric motor 11a of the first force introducing unit 11. A first connecting rod 13a and a second connecting rod 13b are provided on the rotational disc 13. The first connecting rod 13a is connected in an articulated manner to the third rotational joint 2c, which is mounted displaceably on the guide 2g, so that by means of a rotation of the rotational disc 13, which rotation is driven by the second force introducing unit 12, a displacement of the position of the third rotational joint 2c relative to the covering element 1 or to the support element 1a takes place. At the same time, when the rotational disc 13 is rotated, the flap part 10 is pivoted by means of the second connecting rod 13b. The flap part 10 is secured pivotably on the covering element 1 by means of hinges 10b.

Figure 1:
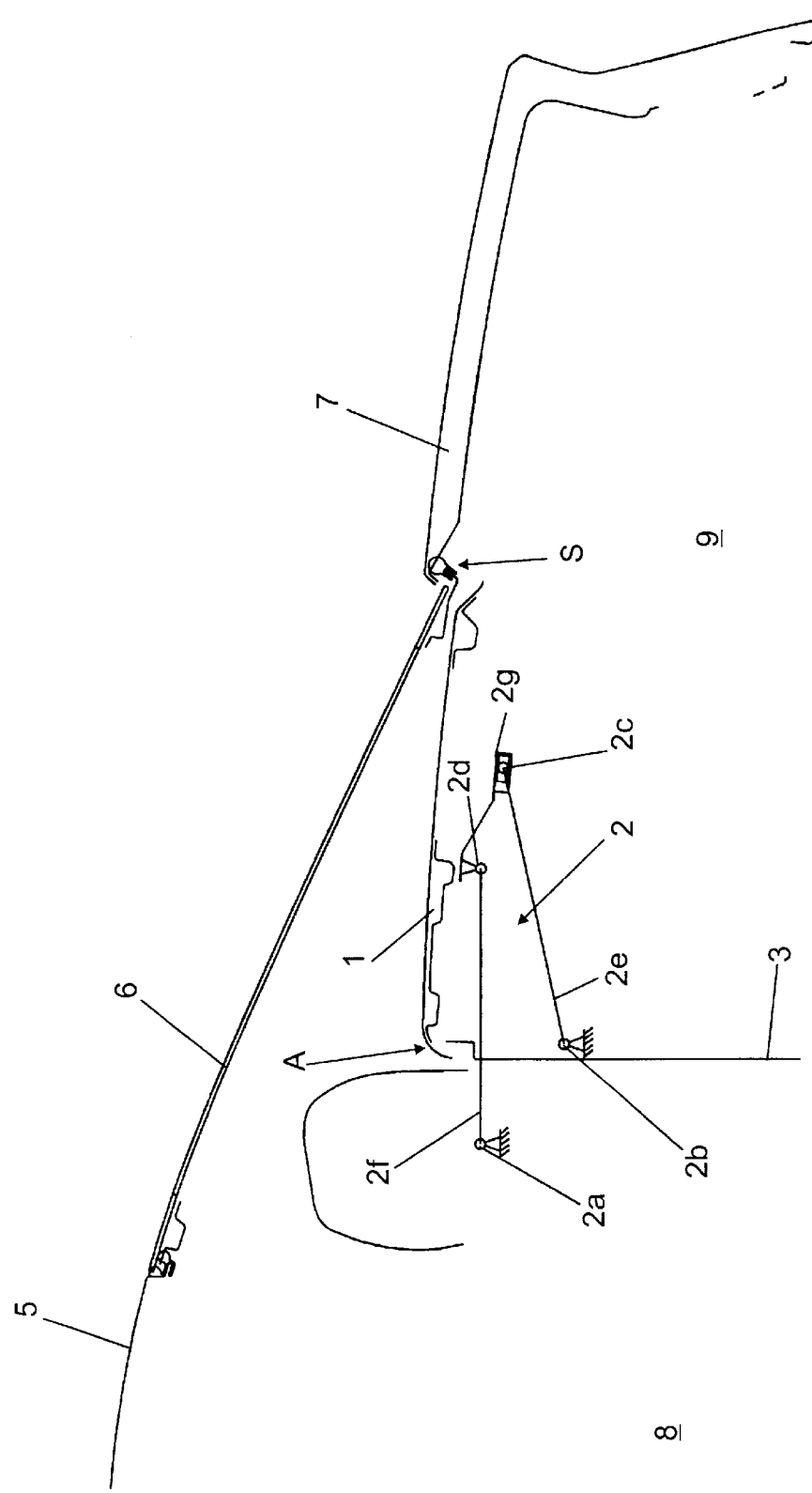
FIG. 1 shows a schematic side view of a top according to the present invention in the closed state.
Figure 15:
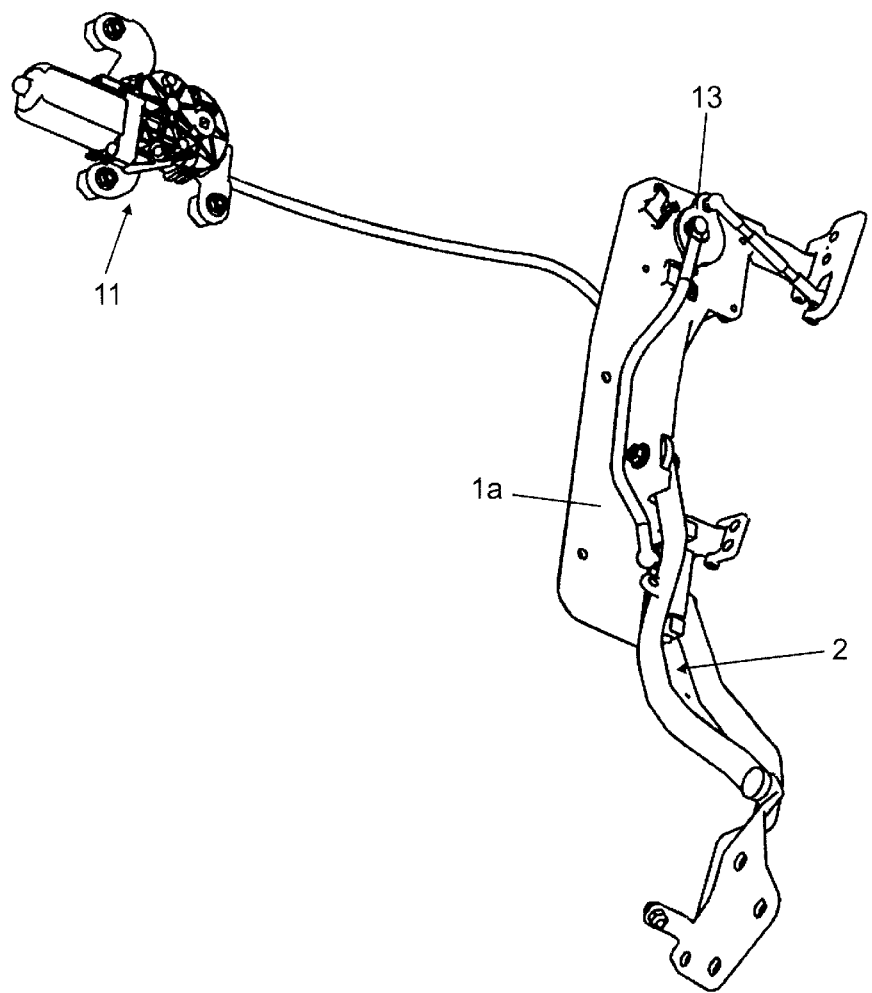
FIG. 15 shows a three-dimensional view of the driving mechanism according to FIG. 12 from a third viewing angle.

The present invention functions as follows:

Starting from the closed position of the top according to FIG. 1, the illustration according to FIG. 6, FIG. 9, FIG. 11 and FIG. 14 likewise being assigned to the closed position of the top, first of all the movably mounted rear element 7 is pivoted open counter to the direction of travel in order to release a substantial part of the movement space of the top according to the present invention. Subsequently, the roof parts 4, 5, 6 are moved in a first step of an opening movement according to FIG. 2 by means of a driving mechanism (not illustrated in detail), in which case, in particular, the rear roof part 6 is displaced under the rear element 7 essentially parallel to the surface of the rear element 7 by means of guide rails (not illustrated). In a second step of an opening movement according to FIG. 3, the covering element 1 is pivoted open by means of the first force introducing unit 11 into a second position in which a movement space which is as large as possible for the roof parts 4, 5, 6 of the top according to the present invention is made available. This position according to FIG. 3 of the covering element 1 also corresponds to the positions in the illustrations according to FIG. 7, FIG. 12 and FIG. 15. It can be seen that in the pivoted open position for releasing the movement space for the roof parts 4, 5, 6 according to FIG. 3, the second force introducing unit 12 has not yet been actuated, since the third rotational joint 2c is still in the same position within its guide 2g as in the first position according to FIG. 1. In a further step of the top-opening movement according to FIG. 4, the three roof parts 4, 5, 6 are completely retracted into rear regions 9 of the convertible vehicle and the rear element 7 is pivoted shut again. In a last step of the top-opening movement according to FIG. 5, the covering element 1 is also pivoted shut again, but not only does a movement of the linkage mechanism 2, which movement is reversed to the previous pivoting open, by means of the first force introducing unit 1 take place, but so too does an actuation of the second force introducing unit 12, as a result of which by means of the rotational disc 13 and the connecting rods 13a, 13b, firstly, the third rotational joint 2c is moved linearly within its guide 2g from one end of the guide 2g to the other end of the guide 2g and, secondly, the side flaps 10 are folded upward. With regard to the spatial position of the covering element 1 in a comparison of the third position with the first position, displacement of the third rotational joint 2c in conjunction with a small follow-up by the linkage mechanism 2 has the effect that the covering element 1 is pivoted essentially about an axis of rotation which is situated in a region A in the vicinity of the upper end region of the boundary 3. By this means, a rear end region of the covering element 1 is pivoted essentially vertically upward, as a result of which an originally existing distance S (see FIG. 1) between the covering element 1 and rear element 7, which distance had been occupied by an end region of the rear roof part 6 in the closed state of the top, is closed.

The previously described movement of the covering element 1 is coordinated, as is also the sequence of movement of the roof parts 4, 5, 6, by a computerized control means which, firstly, prevents parts of the top from colliding with one another, in particular if part of the mechanism is blocked, and which, secondly, makes possible a time-optimized and esthetically attractive sequence of movement. In particular, the use of electric motors in the force introducing units 11, 12 makes it possible in a simple manner to report the current position of the covering element 1 and of the flap parts 10 to the computerized control means. However, as an alternative, other types of drive, for example cylinders having connecting rods, can also be used in the force introducing units 11, 12.

What is claimed is:

1. A top mechanism for a convertible vehicle, the top mechanism comprising:
   a top of the convertible vehicle including at least one rear roof part and moveable between an open state and a closed state;

a rear region of the convertible vehicle, the rear region disposed behind a passenger compartment of the convertible vehicle and configured to receive the top, in an opened state of the top;

a rear element at least partially covering the rear region in a closed state of the top; and a covering element moveable between a first position associated with a closed state of the top, a second position, and a third position associated with an open state of the top;

wherein, in the first position, a first end of the covering element is adjacent to a boundary of the passenger compartment and a second end of the covering element is adjacent to the rear roof part, in the second position a movement space for the top is provided, and in the third position the first end is adjacent to the boundary of the passenger compartment and the second end is adjacent to the rear element.

2. The top mechanism as claimed in claim 1, wherein the covering element includes a linkage mechanism configured to movably connect the covering element to the convertible vehicle.

3. The top mechanism as claimed in claim 2, wherein the linkage mechanism includes a four-bar linkage.

4. The top mechanism as claimed in claim 1, further comprising a first force introducing unit operably connected to the covering element, the first force introducing unit capable of causing a movement of the covering element relative to the convertible vehicle.

5. The top as claimed in claim 3, wherein the linkage mechanism includes a first joint having a first axis of rotation and a second joint adjacent the first joint and having a second axis of rotation, wherein a distance between the first and second axes of rotation is changeable.

6. The top as claimed in claim 5, wherein the distance between the axes of rotation is changeable in an adjustable manner using a second force introducing unit disposed on the covering element.

7. The top as claimed in claim 1, further comprising a flap part movably disposed on the cover element.

8. The top as claimed in claim 7, wherein the flap part is drivable using a second force introducing unit.

9. The top as claimed in claim 1, wherein the top is a hard-shell collapsible top.

10. The top as claimed in claim 9, wherein the hard-shell collapsible top includes three roof parts that cover the passenger compartment in the closed state of the top.

11. The top as claimed in claim 1, wherein the top is a folding top including a flexible top fabric.

12. The top as claimed in claim 11, wherein the folding top includes at least one rigid shell part.

13. The top as claimed in claim 1, wherein the cover element includes a single rigid unit.

14. A method for opening a top of a convertible vehicle, the method comprising:

opening a rear element of the vehicle so as to provide a movement space for the top;

moving a covering element from a first position, in which the covering element is adjacent to a rear boundary of a passenger compartment and is adjacent to a rear roof part of the top, to a second position, in which the covering element provides an additional space for the opening of the top;

retracting at least one roof part of the top into a rear region of the convertible vehicle;

closing the rear element; and moving the covering element into a third position, in which the cover element is adjacent to the rear boundary of the passenger compartment and is adjacent to the rear element.

* * * * *